United States Patent

[11] 3,577,683

| [72] | Inventors | Joseph Silvagi<br>Warren;<br>John W. Conforti, Detroit, Mich. |
|---|---|---|
| [21] | Appl. No. | 752,845 |
| [22] | Filed | Aug. 15, 1968 |
| [45] | Patented | May 4, 1971 |
| [73] | Assignees | Camdale Enterprises<br>Roseville, Mich.;<br>Joseph Silvagi,<br>fractional part interest to each; John W.<br>Conforti, fractional part interest to each |

[54] INVOLUTE GENERATING APPARATUS
9 Claims, 7 Drawing Figs.

[52] U.S. Cl. .................................................. 51/94,
51/234, 51/287
[51] Int. Cl. ............................................... B24b 3/00,
B24b 47/02
[50] Field of Search ........................................ 51/94, 95
(G&H), 105 (Hob), 234

[56] References Cited
UNITED STATES PATENTS

| 1,985,477 | 12/1934 | Wolf | 51/95X(G&H) |
| 2,121,479 | 6/1938 | Drummond | 51/95(G&H) |
| 2,560,967 | 7/1951 | Lohutko | 51/95(G&H) |
| 2,653,426 | 9/1953 | Silvagi | 51/95X(G&H) |
| 2,710,499 | 6/1955 | Alderman | 51/95X(G&H) |
| 2,804,734 | 9/1957 | Mentley et al. | 51/95X(G&H) |

*Primary Examiner*—Othell M. Simpson
*Attorney*—Hauke, Gifford and Patalidis

ABSTRACT: A fixture is disclosed for grinding involute teeth profiles in a gear blank. Each tooth is generated by reciprocating the gear blank tangentially with respect to the grinding edge of a rotating wheel while oscillating the blank about its axis as the axis is constrained to move in a plane that is parallel to the axis of the grinding wheel.

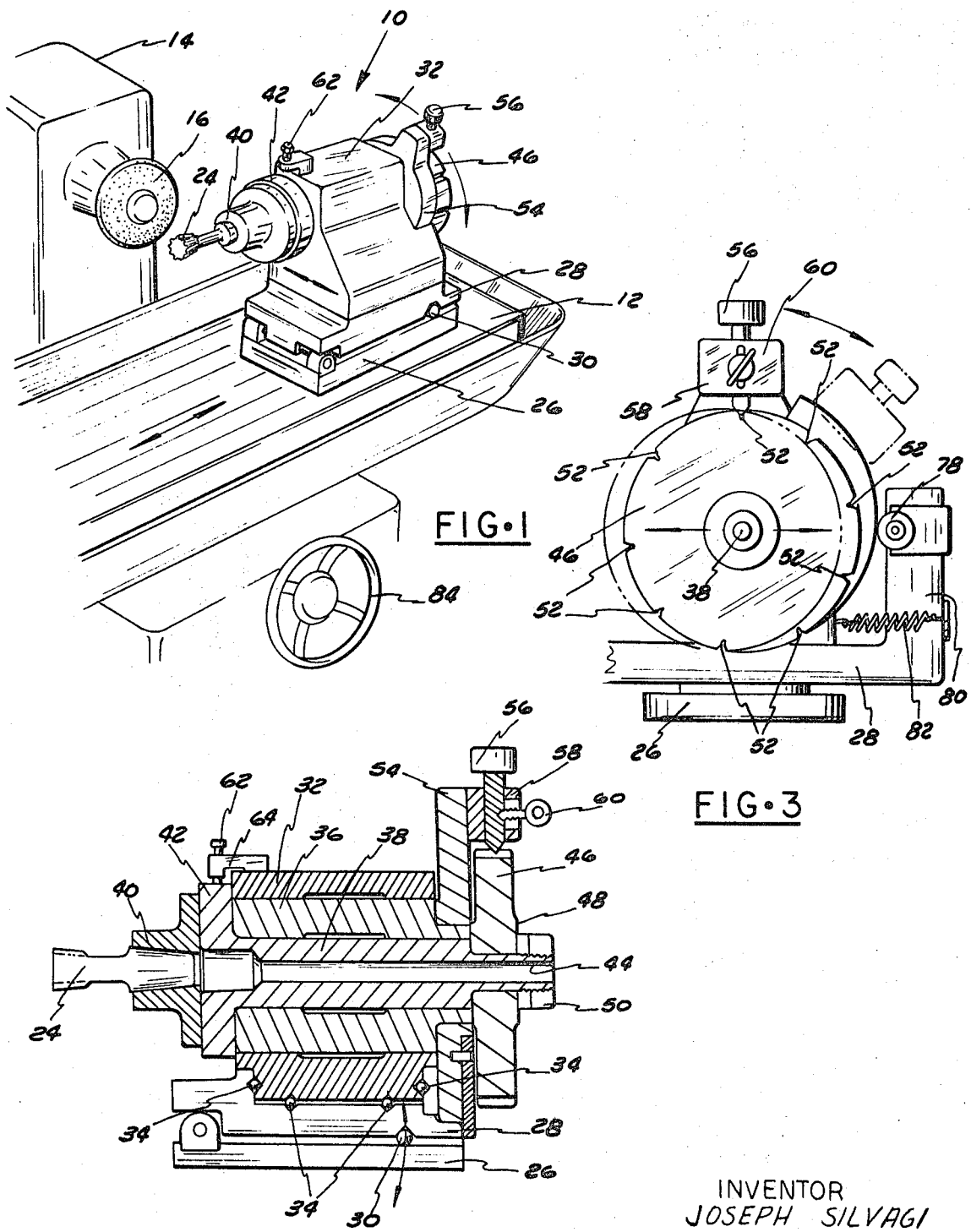

INVENTOR
JOSEPH SILVAGI
JOHN W. CONFORTI
BY
Hauke Knoss Gifford & Patalidis
ATTORNEYS

INVOLUTE GENERATING APPARATUS

BACKGROUND OF THE INVENTION

This invention relates to a method and to apparatus for carrying out the method for accurately grinding involute profiles in a gear blank in which the blank is rolled back and forth under the edge of a rotating grinding wheel as the blank is reciprocated parallel to its face in directions tangential to the wheel such that each side of the wheel alternately grinds a tooth face.

There are a variety of methods and devices for generating teeth in a blank such as rack and pinion generation, base circle diameter, or flexible tape generation. However these conventional techniques are not readily suited for generating involute profiles for small gear shape cutters having a pitch diameter of 1 inch or less.

SUMMARY OF THE INVENTION

A broad purpose of the present invention is to provide means for accurately grinding involute profiles by a method that is well suited for small gears. The cutters produced by the preferred method have involute profiles true within 0.0001 inch from the front cutting face to the end of the tooth. Repeated sharpening of the cutting face does not change the profile accuracy.

The preferred embodiment for carrying out the method includes a fixture that is placed on the table of a tool room surface grinder have an angularly dressed disc-type or double-cone grinding wheel. Any adjustable angular wheel dresser may be employed to form the desired symmetrical or nonsymmetrical angular shape to the grinding wheel.

The fixture has a pair of concentrically supported shafts, including inner and outer shafts, which are mounted on a tilt plate that is hinged to a sine plate base. One end of the inner shaft is adapted to support the gear blank for rotation about its axis and its other end carries a circular index plate having a series of sockets spaced about the axis of the gear's rotation. Each socket is associated with the position of one of the teeth that is to be ground into the blank.

The outer shaft member carries a cam plate adjacent the index plate and a plunger which is engageable with the sockets of the index plate in order to lock the two shafts together against relative rotation when the inner shaft has been positioned with respect to the outer shaft. The two shafts are supported such that they can be translated parallel to the axis of rotation of the grinding wheel and also reciprocated tangentially to the grinding edge of the wheel. The cam plate has a constant rise profile and is biased against a roller carried on the frame such that as the blank is rotated in one direction, it is displaced in one direction parallel to the grinding wheel axis, when rotated in the other direction, it is displaced in the opposite direction with the displacement being a function of the angular interval through which the blank has been rotated.

In operation, the blank is engaged with the grinding edge of the wheel and then reciprocated tangentially with respect to the wheel while simultaneously being oscillated about its axis as it is translated parallel to the axis of the wheel such that the wheel progressively generates the opposed sides of a pair of teeth. At the completion of a grinding cycle, the fixture is moved to separate the blank from the wheel, the inner shaft unlocked from the outer shaft and rotated to its next indexed position, locked to the outer shaft and the grinding cycle repeated. This procedure is repeated until the blank has been formed with a full set of teeth.

The proper face angle for gear shaper-cutters is achieved by tilting the blank at a suitable with respect the sine plate base.

In addition to involute gear shaper-cutters, the apparatus can be employed for generating profiles on small spur gears as well as helical gears. To form a spur gear, the blank is reciprocated in contact with the wheel with its axis at right angles to the axis of the wheel, for a helical gear, the blank is supported with its axis at a suitable helix angle with respect to the axis of the grinding wheel. Nongenerative indexable grinding can also be accomplished by locking both shafts against rotation. For any gear shaper-cutter having involute teeth of a pitch diameter smaller than 4 inches, the only adjustment necessary is to change the cam plate for one with a suitable pitch diameter, and the index plate for the proper number of teeth. Thus the cam plate associated with a gear of 4-inch pitch diameter will generate teeth for any gear cutter with 4-inch pitch diameter. Variations of plus or minus 10 percent in this pitch diameter is accomplished by changing the grinding wheel profile angle.

Furthermore teeth having other shapes besides the involute form may be generated. The preferred apparatus has a smooth and stable operation as compared with conventional devices and can be either manually operated or connected by a suitable linkage to a power means.

The preferred apparatus can also be employed to check the profile of an involute gear by mounting the gear in the fixture and passing a dial indicator, mounted on the grinder frame, over the teeth. Since the profile of the gear teeth depends on the shape of the cam plate, a cam having a shape which is associated with the profile of a standard gear can be employed to control the movement of the gear as it is rolled about its axis. Any variations of the teeth profile can be ascertained by the dial being moved from its zero reference position.

Still other advantages of the present invention will be readily apparent to the one skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a perspective view showing the preferred gear-generating apparatus mounted on the bed of a tool room grinder;

FIG. 2 is a longitudinal sectional view through the supporting fixture;

FIG. 3 is an elevational view of the supporting fixture as viewed from the end opposite to which the gear blank is mounted;

DESCRIPTION OF THE PREFERRED EMBODIMENT

Figure 7:
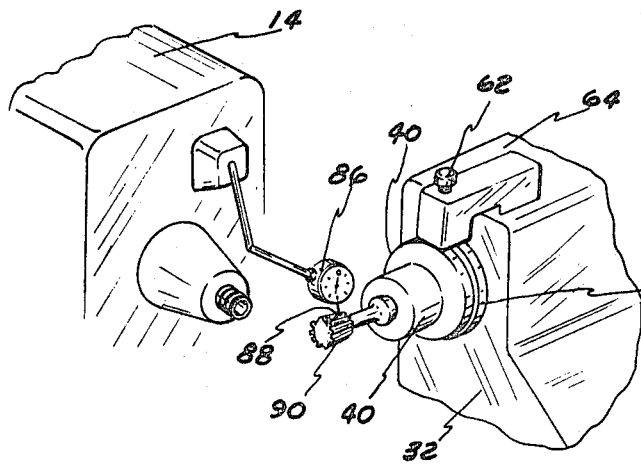
FIG. 7 is a view of the preferred apparatus showing a dial indicator device mounted to check the tooth profile of a gear.

Now referring to the drawings, the preferred gear-generating apparatus is illustrated in FIG. 1 as comprising a support fixture generally indicated at 10, supported on the bed 12 of a tool room surface grinder 14. A rotatable grinding wheel 16 is supported in the conventional manner on the frame of the grinder 14 for rotation about a horizontal axis. As can best be seen in FIG. 5, the circumferential grinding edge of the grinding wheel is dressed by a conventional wheel dresser (not shown) such that it has a predetermined profile including a tip 18 and between a pair of annular side faces 20 and 22 that are beveled at an angle that is associated with the pressure angle of the gear that is being formed from a blank 24.

The support fixture includes a sine plate base 26 is mounted on the bed 12 of the grinder, and a tilt plate 28 that is hinged to the sine plate in the conventional manner. A gauge block (not shown) is calculated for a selected angle between the tilt plate and sine plate and placed under pin 30. This provides the necessary side clearance angle for the teeth of a gear shaper-cutter or tapered gear. A block is mounted on the tilt plate 28, and supported by a series of ball bearings 34 for motion parallel to the axis of rotation of the grinding wheel 16.

A hollow outer shaft 36 and an inner shaft 38 are concentrically mounted on the block 32 with the inner shaft 38 being rotatable with respect to the outer shaft 36 and the outer shaft being rotatable with respect to the block 32.

An adapter 40 carried on a flange 42 at the forward end of the inner shaft is adapted to support the gear shaper-cutter blank 24. The blank 24 is clamped in the adapter 40 such that it rotates with the inner shaft about its axis of rotation. The inner shaft bore 44 that extends between its opposite longitudinal ends provides means for separating the blank 24 out of the adapter 40 by inserting an elongated knockout tool (not shown) through the bore.

A circular index plate 46 is mounted on the rear end of the inner shaft 38 and is fixed with respect to the inner shaft by a washer 48 and a nut 50. The circumferential edge of the index plate is formed with a series of sockets 52 that are angularly spaced about the axis of rotation of the inner shaft. Each socket is associated with the position of a tooth that is being formed in the blank 24 with respect to the axis of the finished gear. Thus, for the purposes of illustration, the blank 24 is being formed with nine teeth so that there are nine sockets, each pair of neighboring sockets being angularly spaced with respect to one another a distance that corresponds to the angular distance between adjacent pairs of teeth in the finished gear.

A cam plate support 54 is fixedly mounted on the outer shaft 36 adjacent the index plate 46. A plunger 56 carried on a projection 58 of the cam support 54 is engageable with the sockets 52 in the index plate so as to lock the cam support 54 and the index plate 46 against relative rotation, as well as the inner shaft 38 and the outer shaft 36. The plunger can be disengaged from the sockets in the index plate in order to rotate the inner shaft 38 with respect to the outer shaft 36 in order to change the portion of the blank that is being finished by the grinding wheel 16. When the plunger 56 is engaged in one of the sockets 52 of the index plate, a locking member 60 prevents the plunger from being accidentally disengaged from the index plate during a grinding cycle. It is to be understood that the plunger 56 is engaged with a different socket 52 during each grinding cycle, each grinding cycle being associated with a formation of a different space in the blank.

Thus it can be seen that the plunger 56 and the sockets 52 provide means for locking the inner shaft 38 and the outer shaft 36 against relative rotation in selected relative positions. A fastener member 62, carried by support section 64 which is fixedly connected to the block 32, is engageable with the flange 42 of the inner shaft to provide means for locking the inner shaft 38 against rotation with respect to the block 32.

Figure 6:
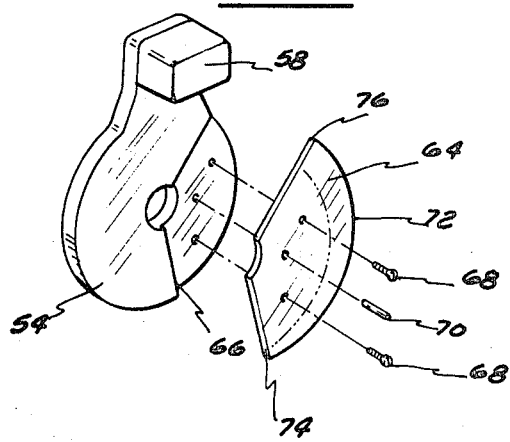
FIG. 6 is an exploded view showing the manner in which the cam plate is mounted on the support fixture.

As best illustrated in FIG. 6, a cam plate 64 is mounted in a recess 66 in the cam support 54 and is fastened to the cam support by a pair of threaded fasteners 68. A dowel 70 which extends from the support and through the cam plate provides means for accurately locating the cam plate on its support. The cam plate has a cam surface 72 with a constant rise that extends between a pair of angularly spaced points 74 and 76. For purposes of illustration, the angular distance between the points 74 and 76 with respect to the axis of the inner shaft, is about 150° which accommodates most conventional tooth profiles. The cam surface 72 of the cam plate is formed so that its radial distance increases at a constant rate with respect to the axis of rotation of the shaft 38 from the point 74 to the point 76. The radial distance between the points 74 and 76 is associated with the pitch diameter of the gear that is being formed.

A follower 78 which is rotatably supported on an upright portion 80 of the tilt plate 68 is engaged with the profile 72 of the cam. A spring bias member 82 connects the block 32 to the upright 80 and urges the block toward the upright 80 such that the cam surface 72 of the cam plate 64 is at all times engaged with the follower 78. Thus it can be seen that, by rotating the cam plate with inner and outer shafts being locked together, the blank 24 can be rotated about its axis as well as translated parallel to the axis of rotation of the grinding wheel in directions both toward and away from the upright 80. As viewed in FIG. 3, clockwise rotation of the cam plate and the blank 24 causes the block 32 to be moved away from the upright 80, and counterclockwise rotation of the cam and the blank causes the block 32 to move toward the upright 80. Thus it can be seen that the profile of the cam provides a relationship between the displacement of the blank 80 parallel to the axis of the grinding wheel that is associated with a given angular rotation of the blank about its axis.

Figure 5:
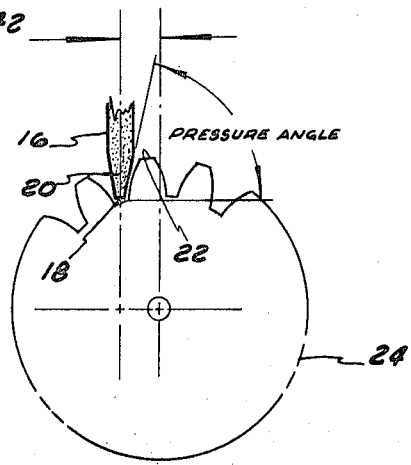
FIG. 5 is a view similar to FIG. 4 but showing the gear blank in a lateral, oscillated position with one side of the wheel grinding the face of a tooth.
Figure 4:
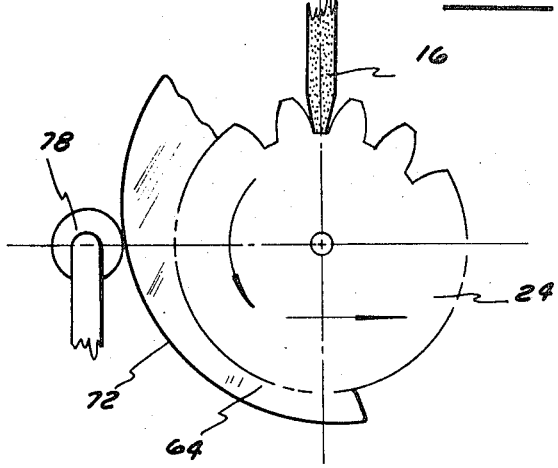
FIG. 4 is a view showing the grinding wheel engaged with the gear blank in its center position below the wheel.

In operation, the unformed blank 24 is mounted in the adapter 40 and then advanced with the fixture to a position in which the axis of the blank is below the grinding wheel, as illustrated in FIG. 4. When contact is established between the wheel 16 and the blank 24, the blank is oscillated tangentially with respect to the grinding wheel by means of a hand wheel 84 which advances the bed 12 of the grinder, and the supporting fixture. As the blank 24 is being reciprocated under the grinding wheel, the operator commences to slowly oscillate the cam support so that the blank 24 moves first toward one face of the grinding wheel and then toward the other face parallel to the axis of the wheel so that both profiles on each side of the wheel are generating teeth in the blank. FIG. 5 shows the blank in one lateral oscillated position in which it has been translated parallel to the axis of the grinding wheel and rotated about its own axis. The operator continues this oscillating motion until the opposed faces of a pair of neighboring teeth have been formed from root to tip.

When the grinding cycle has been completed, the bed 12 is moved away from the grinding wheel 16 to separate the wheel and the blank 24. The operator then disengages the plunger 56 from its socket in the index plate 46, rotates the inner shaft 38 with respect to the outer shaft to align the plunger with the socket associated with the next grinding position, engages the plunger 56 with the index plate 46 to lock the two shafts together, positions the supporting block 52 in its initial position below the grinding wheel, and then advances the bed 12 toward the grinding wheel to commence the grinding cycle. This operation is repeated until the blank 24 has been formed with a complete set of teeth.

In order to form the proper side clearance angle, the tilt plate 28 is raised to a suitable angle with respect to the direction of motion of the fixture that is parallel to the face of the grinding wheel. To form a spur gear, the fixture is mounted on the bed with the axis of the blank at right angles to the grinding wheel axis. To form a helical gear, the fixture is mounted on the bed with the axis of the blank at the proper helix angle with respect to its motion that is at right angles to the wheel axis.

Referring to FIG. 7, a dial indicator 86 is shown as being mounted on a frame of the grinder 24 and has a spring-biased plunger element 88 engaged with the surface of the teeth of a gear 90. In this setup, the indicating device provides means for checking the profile of a gear shaper-cutter in order to determine whether it is within its dimensional tolerances. Since the tooth profile shape depends on the profile of the cam plate 64, a standard cam plate can be employed as a means for comparing the profile of the gear to a standard gear profile. Thus by mounting the gear 90 in the adapter 40 and then rotating the gear about its axis while horizontally moving its axis as dictated by the shape of the profile of the cam, the operator can determine those portions of the gear profile that are out of tolerance by noting in what position the pointer of the indicator 86 moves away from its zero or other reference position.

It is to be understood that although the preferred device is illustrated as being manually operated, it could be power-operated through suitable linkage means. Teeth with other shapes besides the involute form can be generated by locking the two shafts against rotation with respect to the block 32 so that nongenerative indexable grinding can be performed. The index plate 46 can be quickly exchanged for an index plate associated with a gear having a different number of teeth. Similarly the cam plate 64 can be readily exchanged for a cam plate associated with gears of a different pitch diameter. The preferred generating fixture is particularly adapted for generating gears of a relative diameter and in particular has advantages over those devices that employ other techniques when the gear has a pitch diameter of 1 inch or less.

We claim:

1. An apparatus for grinding a gear from a blank, comprising:

frame means;

a first support member and a second support member carried by said frame means, said first and second support members being rotatable about a common axis, the first support member being rotatable with respect to the second support member between a series of relative positions, each of which is associated with one of the teeth that is being formed in the gear blank, and adapted to support the gear blank;

means for locking the first support member to the second support member against relative rotation from a selected one of said series of relative positions;

a wheel supported on said frame means for rotation about its axis, said wheel having a grinding edge with a predetermined profile that is moved in a circular path as the wheel is rotated;

means for moving the said first and second support members in a first motion relative to the wheel in directions parallel to the axis of rotation of the wheel between first and second relative positions;

means for oscillating the first and second support members about their axis at such times as they are locked to one another.

2. The apparatus as defined in claim 1 in which the means for moving the wheel and the first and second support members in their first motions includes means for translating the axis of the first and second support members in directions parallel to the axis of rotation of the wheel; and further comprising: cam means operable to control the displacement of the support members parallel to the axis of the wheel with respect to their angular displacement about the axis.

3. The apparatus defined in claim 2, further comprising: an index plate mounted on the first support member and rotatable therewith, said index plate having a series of sockets formed in an annular array about the axis of rotation of the first support member, each socket being associated with one of said series of relative positions; and plunger means on the second support member engageable with the sockets to lock the two support members against relative rotation in a selected one of said series of relative positions.

4. The apparatus as defined in claim 1, including sine plate means for mounting the support means on the frame such that the axis of rotation of the support means can be tilted to a selected angular position with respect to the direction of the second motion between the support means and the wheel.

5. The apparatus as defined in claim 1, including an indicating device supported on the frame for engagement with a gear mounted in the support means, and cam means carried on the support means having a cam surface with a contour associated with the profile of a standard gear tooth for controlling the translational motion of the support means with respect to its rotational motion such that the tooth profile of the gear can be compared with a standard gear tooth profile as the support means is rotated about its axis and its axis translated with the indicating device engaged with the surface of the gear.

6. An apparatus for grinding a gear from a blank, comprising:

frame means;

support means mounted on said frame means for rotation and adapted to support a gear blank such that the gear blank is rotated as the support means is rotated;

a wheel supported on said frame means said wheel having a grinding edge with a predetermined profile that is moved in a circular path as the wheel is rotated;

means for moving the wheel and the support means in a first motion relative to one another in directions parallel to the axis of rotation of the wheel between first and second relative positions;

means for moving the wheel and the support means in a second motion relative to one another, in directions normal to the axis of rotation of the wheel, and including a cam member carried on said support means and rotatable therewith, a cam follower fixed with respect to said frame means, said cam member having a cam surface formed between a first point and a second point, the first point having a greater radius with respect to the axis of rotation of the cam member than the second point, and angularly spaced therefrom;

means for biasing the cam member toward the cam follower such that the cam follower is in continuous engagement with the cam surface of the cam member during the grinding cycle;

means for rotating the cam member with respect to the cam follower such that the axis of rotation of the cam member is moved in the directions parallel to the axis of the grinding wheel.

7. The apparatus as defined in claim 6, in which the cam surface is so formed that rotation of the support means causes the axis of rotation of the support means to be translated a distance parallel to the axis of rotation of the grinding wheel that is a function of the angular distance through which the support means has been rotated.

8. An apparatus for grinding a gear from a blank, comprising:

frame means;

support means mounted on said frame means for rotation and adapted to support a gear blank such that the gear blank is rotated as the support means is rotated;

a wheel support on said frame means for rotation about its axis, said wheel having a grinding edge with a predetermined profile that is moved in a circular path as the wheel is rotated;

means for moving the wheel and the support means in a first motion relative to one another, in directions parallel to the axis of rotation of the wheel between first and second relative positions;

means for moving the wheel and the support means in a second motion relative to one another, in directions normal to the axis of rotation of the wheel; and a sine plate means for mounting the support means on the frame means such that the axis of rotation of the support means can be tilted to a selected angular position with respect to the direction of the second motion between the support means and the wheel.

9. An apparatus for grinding a gear from a gear blank comprising:

frame means;

support means mounted on said frame means for rotation and adapted to support a gear blank such that the gear blank is rotated as the support means is rotated;

a wheel supported on said frame means for rotation about its axis, said wheel having a grinding edge with a predetermined profile that is moved in a circular path as the wheel is rotated;

means for moving the wheel and the support means in a first motion, relative to one another, in directions parallel to the axis of rotation of the wheel between first and second relative positions;

means for moving the wheel and the support means in a second motion, relative to one another, in directions normal to the axis of rotation of the wheel;

an indicating device supported on the frame for engagement with a gear mounted in the support means;

cam means carried on the support means having a cam surface with a contour associated with the profile of a standard gear tooth for controlling the translational motion of the support means with respect to its rotational motion such that the tooth profile of the gear can be compared with a standard gear tooth profile as the support means is rotated about its axis and its axis translated with the indicating device engaged with the surface of the gear.

UNITED STATES PATENT OFFICE
CERTIFICATE OF CORRECTION

Patent No. 3,577,683     Dated May 4, 1971

Inventor(s) Joseph Silvagi

It is certified that error appears in the above-identified patent and that said Letters Patent are hereby corrected as shown below:

Column 1, line 68, after "suitable"
 insert --angle--

Column 2, line 73, after "block"
 insert --32--

Column 3, line 58, change "pints"
 to --points--

Signed and sealed this 31st day of August 1971.

(SEAL)
Attest:

EDWARD M. FLETCHER, JR.
Attesting Officer

WILLIAM E. SCHUYLER, JR.
Commissioner of Patents